(12) United States Patent
Hashimoto

(10) Patent No.: US 6,845,940 B2
(45) Date of Patent: Jan. 25, 2005

(54) LIFT GENERATOR BY CONTINUOUSLY ROTATING IMPELLER

(76) Inventor: Kikushiro Hashimoto, 19-5, Shimouma 3-Chome, Setagaya-Ku, Tokyo (JP), 154-0002

( * ) Notice: Subject to any disclaimer, the term of this patent is extended or adjusted under 35 U.S.C. 154(b) by 0 days.

(21) Appl. No.: 10/381,798
(22) PCT Filed: Sep. 13, 2001
(86) PCT No.: PCT/JP01/07934
§ 371 (c)(1), (2), (4) Date: Mar. 28, 2003
(87) PCT Pub. No.: WO02/26560
PCT Pub. Date: Apr. 4, 2002

(65) Prior Publication Data
US 2004/0011922 A1 Jan. 22, 2004

(30) Foreign Application Priority Data
Sep. 28, 2000 (JP) ........................... 2000-335203

(51) Int. Cl.⁷ .............................................. B64C 27/22
(52) U.S. Cl. .................. 244/9; 244/19; 244/70
(58) Field of Search ................. 244/9, 10, 19, 244/21, 70; 416/178

(56) References Cited

U.S. PATENT DOCUMENTS

| | | | | | |
|---|---|---|---|---|---|
| 1,304,187 | A | * | 5/1919 | Lind | 244/10 |
| 1,529,869 | A | * | 3/1925 | Burill | 244/10 |
| 1,631,861 | A | * | 6/1927 | Sachs | 244/10 |
| 1,975,098 | A | * | 10/1934 | Gardner | 244/10 |
| 2,397,189 | A | * | 3/1946 | Main | 244/10 |
| 3,868,073 | A | | 2/1975 | King | |
| 6,007,021 | A | * | 12/1999 | Tsepenyuk | 244/9 |

FOREIGN PATENT DOCUMENTS

| | | |
|---|---|---|
| EP | 0 393 752 | 10/1990 |
| JP | 61-105298 | 5/1986 |
| RU | 2 136 539 | 9/1999 |

* cited by examiner

*Primary Examiner*—Galen Barefoot
(74) *Attorney, Agent, or Firm*—Young & Thompson

(57) ABSTRACT

In order to continuously rotate an impeller having an axis parallel to a ground surface in one direction to generate lift, a cover close to a periphery in an opposite lift side is provided within a half of an outer periphery of the impeller, and a cylindrical scroll wheel integrally and concentrically rotating with the impeller is provided in a cavity portion near a root of the impeller, whereby a balance between the lift side and the opposite lift side is broken aerodynamically.

2 Claims, 2 Drawing Sheets

LIFT GENERATOR BY CONTINUOUSLY ROTATING IMPELLER

This is the 35 USC 371 national stage of International Application PCT/JP01/07934 filed on Sep. 13, 2001, which designated the United States of America.

TECHNICAL FIELD

The present invention relates to an apparatus for generating lift by an impeller provided in a rotation axis parallel to a ground surface.

BACKGROUND ART

Even in the case of rotating an impeller having at least one impeller blade as shown in FIGS. 1A and 1B, a lift side and an opposite lift side are cancelled by each other, and of course, the lift cannot be generated in view of common sense and of a theoretical sense. Accordingly, there has been considered a method of reducing wind pressure during a period that the blade rotates in the opposite lift side. For example, there is a method of letting out the wind pressure by arranging a valve, a method of changing a direction against the wind pressure, a method of reducing an area, and the like. Each of these methods has a complex structure, tends to generate a trouble, accompanies a vibration and noise, and has a deteriorated efficiency. Accordingly, aircraft utilizing such impeller have not been put to practical used as the matter stands. As mentioned above, in conventional, there is a defect that the lift cannot be generated without using a valve, an eccentric cam and the other complex mechanisms.

DISCLOSURE OF THE INVENTION

In order to solve the problem mentioned above, in accordance with the present invention, there is tried a method of reducing an efficiency in the opposite lift side on the basis of an aerodynamic method without modifying the impeller as mentioned above at all. Is such means can be carried out?

BEST MODE FOR CARRYING OUT THE INVENTION

Figure 1A:
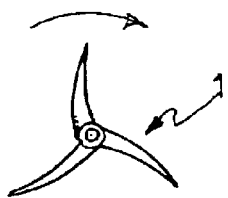
FIG. 1A is a front elevational view of an impeller.
Figure 1B:
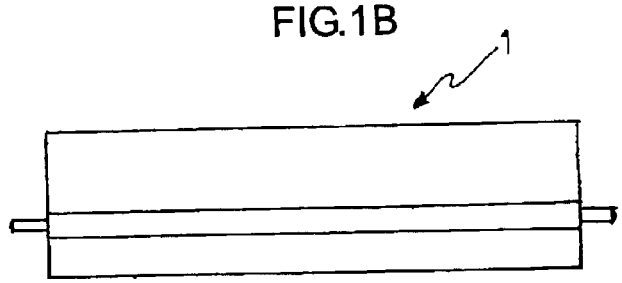
FIG. 1B is a side elevational view of the impeller.
Figure 2A:
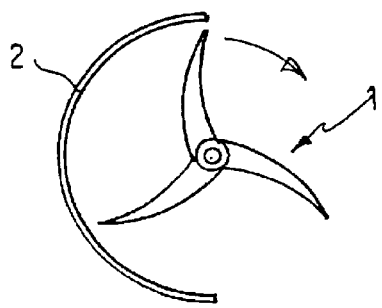
FIG. 2A is a front elevational view of an impeller with a semicylindrical cover.
Figure 2B:
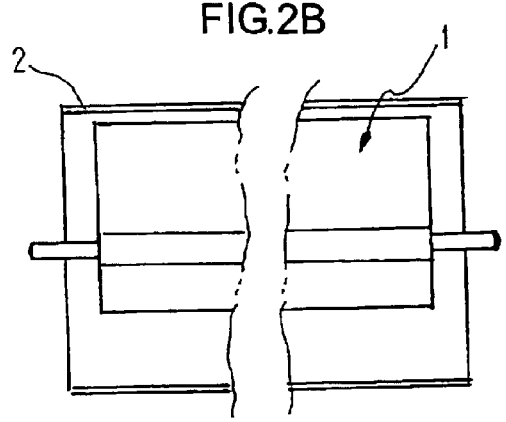
FIG. 2B is a side elevational view of the impeller with the semicylindrical cover.

First, as shown in FIGS. 2A and 2B, a semicylindrical cover 2 close to an outer periphery of an impeller 1 is provided in an opposite lift side (a left half of a circumference in this case). As a result, unexpectedly, lift is slightly generated. It is considered that this is because an efficiency in the opposite lift side in which the motion is made under a closed state is reduced, and a balance with the lift side is broken.

Figure 3A:
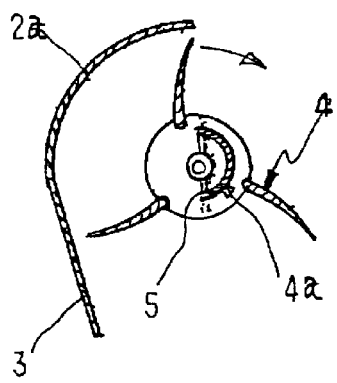
FIG. 3A is a front elevational view of a cover of which a lower portion is opened, an impeller having a cavity portion and a semicylindrical partition plate.
Figure 3B:
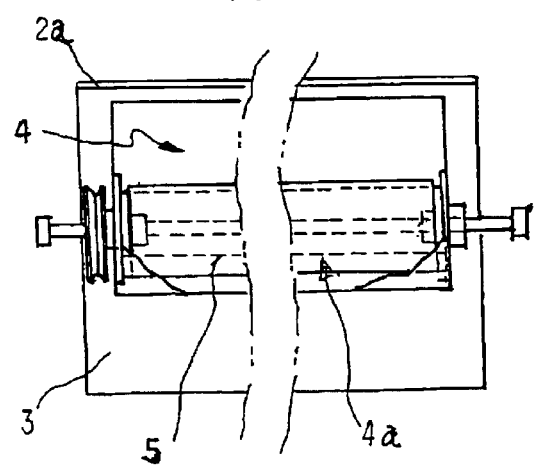
FIG. 3B is side elevational view of a cover having an open lower portion, an impeller having a cavity portion and a semicylindrical partition plate.

Next, as shown in FIGS. 3A and 3B, when the semicylindrical cover 2 is changed to a cover 3 which is provided about 90 degrees in an upper portion and has an open lower half, the lift is increased. Further, a cavity portion 4a is provided in the periphery of a shaft of the impeller 1, whereby an impeller 4 through which an air stream can freely pass is provided. As a result of this, the lift is greatly increased. It is considered that this is because a downward air stream is generated in the opposite lift side, and the efficiency is further reduced. Further, when a semicylindrical partition plate 5 having approximately the same length as an axial length of the blade is provided near an inner periphery of the lift side of the impeller, within the cavity portion 4a, a further effect is obtained. It is considered that this is because the downward air streams in the lift side and the opposite lift side are regulated and are increased. However, since it becomes a little complex to provide a stationary portion in the rotating mechanism, the same effect can be obtained by structuring a cylinder (not shown) such as to integrally rotate concentrically with the impeller.

Figure 4A:
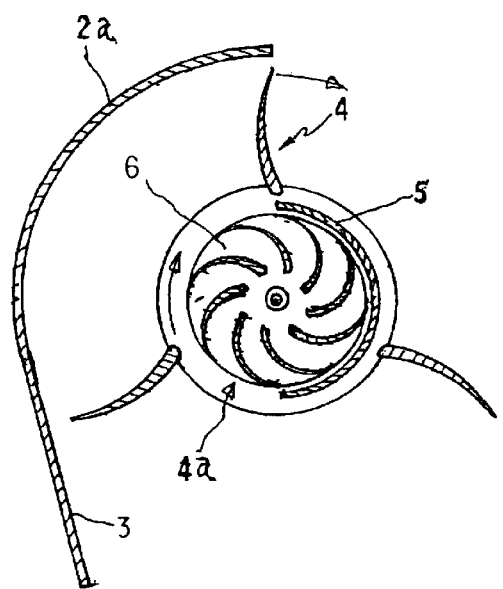
FIG. 4A is a front elevational view of a structure in which a cylindrical scroll wheel is provided.
Figure 4B:
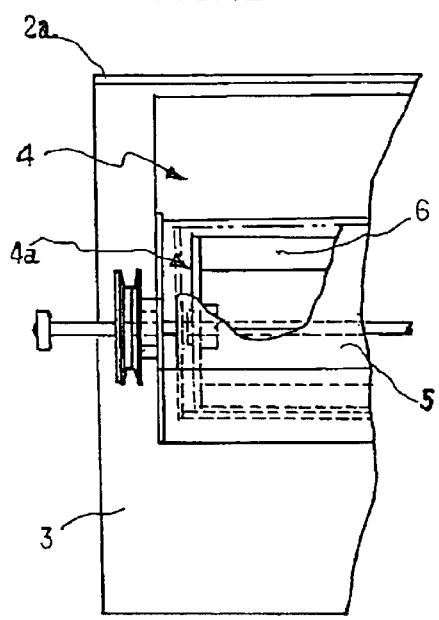
FIG. 4B is a side elevational view of the structure in which the cylindrical scroll wheel is provided.

Finally, as shown in FIGS. 4A and 4B, a cylindrical scroll wheel 6 integrally and concentrically rotating with the impeller 4 is provided within the cavity portion 4a a little apart from an inner periphery of the impeller without the partition plate 5. This has a gap in a center portion, and has a spiral in an opposite direction to the rotation. As a result, the lift is most increased. That is, the structure having no center gap, the structure having an inverse spiral direction, a helical wheel (all of them are not illustrated) and the like are tried, however, it is impossible to find any structure having more effect than the structure in FIGS. 4A and 4B, at this stage. It is considered that this is caused by an increase of the downward air stream due to a centrifugal force, however, no accurate breakthrough cannot be obtained at this stage. In this case, it is possible to increase the effect more by using the partition plate 5 together, however, the structure becomes slightly complex (for example, an unstable element such as a matter that one end is supported in a rotation state via a bearing with respect to a fixed center axis is increased), so that a sufficient effect can be obtained even if it is omitted as the case may be, in the practical application. That is, in an apparatus which has no partition plate, and employs three blades, the scroll wheel 6 mentioned above and the cover 3, it is confirmed that at least about 1 kg lift is generated per horse power, in accordance with measurement of the inventor. Further, when placing in the air stream parallel to the rotation axis under the rotating state, at least 50% lift is increased. That is, it is known that the lift is generated according to an advance, in the same manner as the stator blade. However, this is a quite small value in comparison with the present aircraft. For example, this is a quite small value in comparison with a thrust about 3.6 kg per horse power in a small helicopter having a weight about 1800 kg and a power 500 horse power, and a thrust about 6 kg per horse power in a small aircraft having the same weight and a power 300 horse power. Accordingly, it is impossible to put to practical use as the aircraft.

INDUSTRIAL APPLICABILITY

Figure 5:
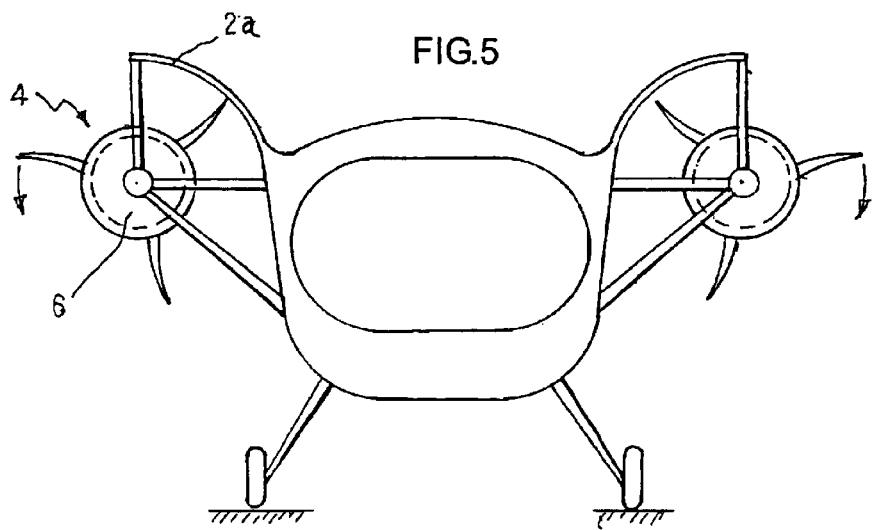
FIG. 5 is a front elevational view of an application of the impeller.

That is, as shown in FIG. 5, it is considered that it is best way to symmetrically arrange a pair of impellers in accordance with the present invention, employ a basic model synchronously rotating in a direction of an arrow and apply to a current convertible system (a propeller direction converting system). In this case, it is extremely convenient to compress a span of a long main wing at a degree corresponding to the lift of the present invention so as to intend to make the structure compact. Since restoring force against a side slip is reduced due to the compression, this countermeasure is required. Further, in the case that an engine stops, there is a defect that a landing force caused by a glide or an auto rotation is not generated. An efficiency of a horizontal displacement is bad. However, it is expected that an air craft having the following advantages can be realized. (A) In convertible, a good stability is obtained during the conversion of the propeller direction. (B) There is no speed limit for the rotor as in the helicopter. (C) There is no downward air stream in a wide range, in the same manner. (D) A danger such as a vortex ring is not considered, in the same manner. (E) An aircraft having a much compact structure can be realized. As a result mentioned above, it is considered to be expected that an aircraft suitable for extinguishing a fire from the air, gathering information, moving at a short distance within a city and the like appear. In this case, the cause of the lift generation is extremely complex, and can not be solved phenomenally as well as mathematically, at this stage, however, it is a fact that the lift generation is experimentally confirmed.

It would have to be said that it is a useful invention to mark the beginning of the lift generating method which has been considered to be impossible by the method mentioned above.

What is claimed is:

1. A lift generating apparatus, which comprises:

an impeller;

a cover having an opened lower portion provided near an outer periphery in an opposite lift side of the impeller so as to cover the opposite lift side while leaving a lift side thereof uncovered;

a cavity portion provided in the periphery of a shaft of the impeller; and a stationary semi-cylindrical partition plate provided near an inner periphery of the lift side of the impeller within the cavity portion.

2. The lift generating apparatus according to claim 1, further comprising a cylindrical scroll wheel provided within the cavity portion; said cylindrical scroll wheel integrally and concentrically rotating with the impeller, and having a gap in a center portion and a spiral in an opposite direction to the rotation.

* * * * *